(12) United States Patent
Chen et al.

(10) Patent No.: US 11,098,212 B2
(45) Date of Patent: Aug. 24, 2021

(54) POLYURETHANE-BASED BINDER DISPERSION

(71) Applicant: Hewlett-Packard Development Company, L.P., Spring, TX (US)

(72) Inventors: Tienteh Chen, San Diego, CA (US); Benjamin Abelovski, San Diego, CA (US); Olakemi Akinlabi, San Diego, CA (US); Gregg A. Lane, San Diego, CA (US); Or Brandstein, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/462,474

(22) PCT Filed: Feb. 27, 2017

(86) PCT No.: PCT/US2017/019582
§ 371 (c)(1),
(2) Date: May 20, 2019

(87) PCT Pub. No.: WO2018/156158
PCT Pub. Date: Aug. 30, 2018

(65) Prior Publication Data
US 2019/0270899 A1 Sep. 5, 2019

(51) Int. Cl.
C09D 11/322 (2014.01)
C08G 18/12 (2006.01)
(Continued)

(52) U.S. Cl.
CPC ........ *C09D 11/322* (2013.01); *C08G 18/0823* (2013.01); *C08G 18/0828* (2013.01);
(Continued)

(58) Field of Classification Search
None
See application file for complete search history.

(56) References Cited

U.S. PATENT DOCUMENTS 4,026,713 A 5/1977 Sambucetti et al.
5,700,851 A 12/1997 Banning et al.
(Continued)

FOREIGN PATENT DOCUMENTS

CN 101362815 2/2009
CN 101590726 12/2009
(Continued)

OTHER PUBLICATIONS

Kuraray Polyols (Year: 2014).*
(Continued)

Primary Examiner — Peter A Salamon
(74) Attorney, Agent, or Firm — HP Inc. Patent Department

(57) ABSTRACT

An inkjet ink composition comprising a polyurethane-based binder dispersion is described. The polyurethane-based binder dispersion comprises: a polyurethane, which comprises: (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain; (D) a carboxylic acid functional group with two hydroxyl functional groups; and (E) a compound shown in formula (1): m(M+)n(X)—R—Y— (1), wherein m is 0 or 1, M is a metal, n is 2 to 10, X is an amino group, R is a C1 to C18 alkyl group, a C6 to C30 aromatic compound or a C4 to C20 aliphatic cyclic compound, and Y is SO3- or SO3H, with the proviso that when m is 0, Y is SO3H and when m is 1, Y is SO3-.

12 Claims, 1 Drawing Sheet

(51) Int. Cl.

| | | |
|---|---|---|
| *C08G 18/08* | (2006.01) | |
| *C08G 18/34* | (2006.01) | |
| *C08G 18/38* | (2006.01) | |
| *C08G 18/48* | (2006.01) | |
| *C08G 18/66* | (2006.01) | |
| *C08G 18/75* | (2006.01) | |
| *C09D 11/38* | (2014.01) | |
| *C09D 11/54* | (2014.01) | |
| *C09D 175/08* | (2006.01) | |
| *C08G 18/40* | (2006.01) | |
| *C08G 18/62* | (2006.01) | |
| *C09D 11/102* | (2014.01) | |

(52) U.S. Cl.
CPC .......... *C08G 18/12* (2013.01); *C08G 18/348* (2013.01); *C08G 18/3857* (2013.01); *C08G 18/4063* (2013.01); *C08G 18/4825* (2013.01); *C08G 18/4854* (2013.01); *C08G 18/6225* (2013.01); *C08G 18/6685* (2013.01); *C08G 18/755* (2013.01); *C08G 18/758* (2013.01); *C09D 11/102* (2013.01); *C09D 11/38* (2013.01); *C09D 11/54* (2013.01); *C09D 175/08* (2013.01)

(56) References Cited

U.S. PATENT DOCUMENTS

| | | |
|---|---|---|
| 5,703,158 A | 12/1997 | Duan et al. |
| 5,785,743 A | 7/1998 | Adamic et al. |
| 5,889,083 A | 3/1999 | Zhu |
| 6,136,890 A | 10/2000 | Carlson et al. |
| 7,429,293 B2 | 9/2008 | Cai |
| 8,008,391 B2 * | 8/2011 | Enomoto ............ C09B 67/009 524/513 |
| 8,556,402 B2 | 10/2013 | Li |
| 8,974,049 B2 | 3/2015 | Prasad et al. |
| 9,090,734 B2 | 7/2015 | Kraiter et al. |
| 9,296,910 B2 | 3/2016 | Brown et al. |
| 2003/0078359 A1 * | 4/2003 | Ichinohe ............ A61L 27/18 528/25 |
| 2005/0039634 A1 | 2/2005 | Hermansky |
| 2007/0282037 A1 | 12/2007 | Anderson et al. |
| 2008/0022887 A1 | 1/2008 | Tanoue |
| 2008/0138530 A1 | 6/2008 | Lin |
| 2008/0146691 A1 | 6/2008 | Kruger et al. |
| 2008/0257203 A1 | 10/2008 | Choy et al. |
| 2009/0071366 A1 | 3/2009 | Akers et al. |
| 2009/0185019 A1 | 7/2009 | Ogasawara |
| 2009/0239996 A1 | 9/2009 | Saito |
| 2010/0047456 A1 | 2/2010 | Kariya |
| 2010/0201768 A1 | 8/2010 | Udagawa |
| 2011/0032303 A1 | 2/2011 | Li |
| 2011/0164086 A1 | 7/2011 | Goto |
| 2011/0281988 A1 | 11/2011 | Tanoue |
| 2012/0035317 A1 | 2/2012 | Roberts et al. |
| 2013/0083117 A1 | 4/2013 | Ohmoto |
| 2013/0108809 A1 | 5/2013 | Noguchi et al. |
| 2013/0201252 A1 | 8/2013 | Namba |
| 2013/0209708 A1 | 8/2013 | Gane et al. |
| 2013/0253130 A1 | 9/2013 | Berge |
| 2013/0266776 A1 | 10/2013 | Matsuoka et al. |
| 2013/0267656 A1 | 10/2013 | Berge |
| 2013/0307914 A1 | 11/2013 | Chen |
| 2013/0328973 A1 | 12/2013 | Kakikawa |
| 2014/0037913 A1 | 2/2014 | Nagahama et al. |
| 2014/0055520 A1 | 2/2014 | Inumaru et al. |
| 2014/0192112 A1 | 7/2014 | Nagashima |
| 2014/0364548 A1 | 12/2014 | Everhardus et al. |
| 2016/0215157 A1 | 7/2016 | Kakikawa |
| 2017/0037269 A1 | 2/2017 | Isobe |
| 2017/0183522 A1 | 6/2017 | Chaffins |
| 2019/0270899 A1 * | 9/2019 | Chen ................... C08G 18/348 |
| 2019/0367692 A1 * | 12/2019 | Zhou ................... B33Y 80/00 |

FOREIGN PATENT DOCUMENTS

| | | |
|---|---|---|
| CN | 102766246 | 11/2012 |
| CN | 102884145 | 1/2013 |
| CN | 104662108 | 5/2015 |
| JP | H0625377 | 2/1994 |
| JP | 2009233486 | 10/2009 |
| JP | 2012201730 | 10/2012 |
| JP | 2012201730 A * | 10/2012 |
| RU | 2264493 | 11/2005 |
| SU | 482433 | 8/1975 |
| WO | WO 0194480 | 12/2001 |
| WO | WO 2007112244 | 10/2007 |
| WO | WO 2012105949 | 8/2012 |
| WO | WO 2015023274 | 2/2015 |
| WO | WO 2015041702 | 3/2015 |
| WO | WO 2015112115 | 7/2015 |
| WO | WO 2015116028 | 8/2015 |
| WO | WO 2015116029 | 8/2015 |
| WO | WO 2015116030 | 8/2015 |
| WO | WO 2015130498 | 9/2015 |
| WO | WO 2015187143 | 12/2015 |
| WO | WO 2016018306 | 2/2016 |
| WO | WO 2016030452 | 3/2016 |
| WO | WO 2016030454 | 3/2016 |
| WO | WO 2016068985 | 5/2016 |
| WO | WO 2016122563 | 8/2016 |
| WO | WO 2016122566 | 8/2016 |
| WO | WO 2016122569 | 8/2016 |
| WO | WO-2017074349 | 5/2017 |
| WO | WO 2018156156 | 8/2018 |
| WO | WO 2018182568 | 10/2018 |
| WO | WO 2018190806 | 10/2018 |

OTHER PUBLICATIONS

"Definition of compound—Chemistry Dictionary", 2017, 4 pages.
Nelson, Daniel, "Amino Group: Definition and Examples", Scien Trends, May 16, 2019, 3 pages.
"Alkyl groups", IUPAC Gold Book, 2008, 1 page.
International Search Report and Written Opinion for International Application No. PCT/US2017/019582 dated Nov. 16, 2017, 10 pages.

* cited by examiner

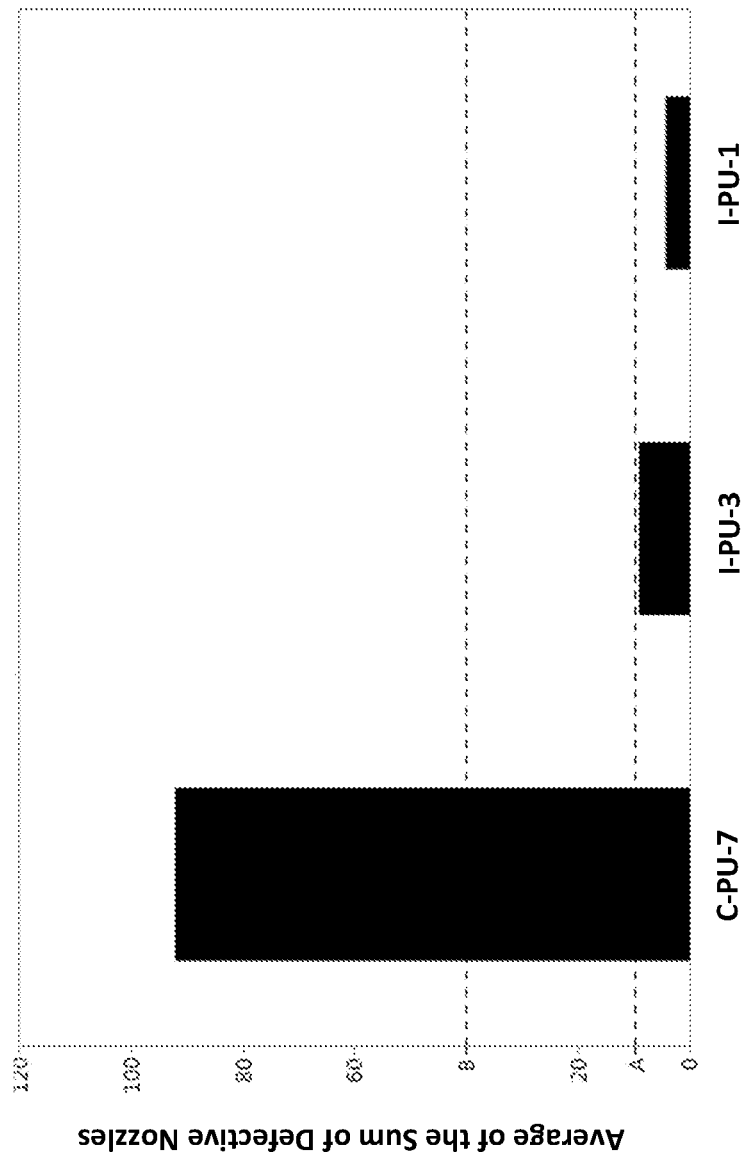

POLYURETHANE-BASED BINDER DISPERSION

BACKGROUND

Inkjet printing is a common printing technique for recording images on a variety of media, including plain paper and photo paper. Inkjet printers form ink droplets using heat or mechanical vibration. As an example, thermal inkjet printers include resistors that create heat, which vaporizes ink in an ink nozzle on a cartridge to create a bubble. As the bubble expands, some of the ink is pushed out of the ink nozzle and onto the desired medium. The ink used may include a colorant and some combination of ingredients to achieve desired print quality and/or printer performance.

BRIEF DESCRIPTION OF THE DRAWING

FIG. 1 shows a bar graph of polyurethane dispersions versus the average of the sum of defective nozzles.

DETAILED DESCRIPTION

Most polymers used in inkjet compositions contribute to poor Sustained Printing and Recovery (SPAR) performance for the inks. These polymers have included polyurethanes and latexes. Without wishing to be bound by theory, it is believed that the main reason for poor SPAR performance is that these polymers form films that are too "hard" to re-dissolve or blast away. As a result, inkjet inks containing polyurethanes or latex tend not to exhibit good jetting performance because ink droplets can puddle around nozzle plate(s) and can eventually interfere with the ink jetting process.

SPAR is defined as the reliability of an ink that is jetted continuously from the printhead for hours with no pauses or servicing and ability to recover the print head after servicing at the end of a long print run. When subjected to this long printing environment, most polymer-containing inks will "crust," or form a tough, hard, irremovable film on the printhead nozzle plate. This hard film clogs nozzles, hinders drop ejection and trajectory, and eventually stops the ink from jetting altogether, resulting in a "dead" printhead. Crusting occurs because of ink puddling, evaporation and polymer film formation. First, ink "puddling" occurs on the printhead nozzle plate, which results in a pool of ink sitting on the (heated) nozzle plate. Then evaporation (driven by airflow and heat from the nozzle plate) reduces the water content of the ink puddle, which raises ink viscosity due to concentration of ink components. Finally, when the polymer in the ink becomes concentrated enough (due to evaporation), it film-forms on the nozzle plate, creating a hard "crust" that cannot be re-dissolved by water/solvents, or blasted away by subsequent nozzle firing events.

Several SPAR mitigation strategies exist for the known polymer-containing inkjet inks. However, these strategies have disadvantages. One strategy is printhead servicing, which can be used to wipe/clean the printhead nozzle plate, and prevent polymer films from building up and crusting. However, this approach forces the printing process to "pause" while servicing is completed. This "servicing cycle" lowers the average print speed of the press and has a negative impact on press productivity. Another SPAR mitigation strategy is to decrease the polymer content of the inkjet ink. However, this approach negatively impacts the inkjet ink composition durability and results in easily-damaged printed images that tend not to survive the hot corrugation process or other stresses in certain applications (e.g., packaging market).

The above mitigation strategies severely limit the productivity, efficiency, and durability of prints. There is, therefore, a need for inkjet inks containing polymers that can jet better without forming excessive puddling around nozzle plate or form "softer" films to solve the SPAR problem. Forming "softer" films can not only reduce puddling but can also make it easier to remove any build-up by servicing. In addition, these inkjet inks should also have good performance in decap, kogation, image quality, durability, and mechability.

It has been found that the polyurethane-based binder dispersions described herein comprising a polyisocyanate and polyether polyol produce excellent SPAR results in inkjet inks.

In particular, the polyurethane-based binder dispersions described herein demonstrate several advantages over existing methods. Because these dispersions exhibit great SPAR performance over many hours of printing, they require little or no printhead servicing while printing. This enables higher print speeds and therefore higher press productivity for packaging press owners. The ability to recover the printheads with minimal servicing reduces down time and increases press productivity, which can be important in the industrial printing market. In addition, these polyurethane-based binder dispersions can still be used at high amounts in the ink (i.e., more than the typical about 1 wt %), enabling prints with durability that can survive the hot corrugation process.

Polyurethane-Based Binder Dispersion

In some examples, a polyurethane-based binder dispersion is disclosed. The polyurethane-based binder dispersion comprises water and a polyurethane. The polyurethane is dispersed in the water. The polyurethane can comprise:

(A) a polyisocyanate;
(B) a first polyol having a chain with two hydroxyl functional groups at one end of the chain and no hydroxyl groups at an opposed end of the chain;
(C) a second polyol having a chain with two hydroxyl functional groups at both ends of the chain;
(D) a carboxylic acid functional group with two hydroxyl functional groups;
(E) a compound shown in formula (1) below $$m(M^+)\ n(X)\text{—R—Y} \tag{1}$$

wherein
m is 0 or 1;
M is a metal;
n is 2 to 10;
X is an amino group,
R is a $C_1$ to $C_{18}$ alkyl group, a $C_6$ to $C_{30}$ aromatic compound or a $C_4$ to $C_{20}$ aliphatic cyclic compound, and
Y is $SO_3^-$ or $SO_3H$
with the proviso that when m is 0, Y is $SO_3H$ and when m is 1, Y is $SO_3^-$.

(F) an optional homopolymer or copolymer of poly(ethylene glycol) having one or two hydroxyl functional groups or one or two amino functional groups at one end of its chain.

In some examples, a polyurethane-based binder dispersion can comprise: water and a polyurethane. The polyurethane in these examples can comprise: (A) a polyisocyanate, which is an isophorone diisocyanate (IPDI); (B) a first polyol having a chain with two hydroxyl functional groups at one end of the chain and no hydroxyl groups at an opposed end of the chain; (C) a polyether polyol having a chain with two hydroxyl functional groups at both ends of the chain; (D) a carboxylic acid functional group with two hydroxyl functional groups; (E) a sulfonate or sulfonic acid functional group having two amino functional groups; and (F) an optional homopolymer or copolymer of poly(ethylene glycol) having one or two hydroxyl functional groups or one or two amino functional groups at one end of its chain.

In some examples, the polyurethane can be defined as the following:

(A) is isophorone diisocyanate, which is present in the polyurethane in an amount of from about 24 wt % to about 30 wt % based on the total weight of the polyurethane, (B) is a copolymer of methyl methacrylate-co-ethylhexylacrylate-co-ethoxyethoxyethylacrylate with two hydroxy groups at one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B), (C) is polypropylene glycol with a $M_n$ of 1000 g/mol, which is present in the polyurethane in an amount of from about 12 wt % to about 18 wt % based on the total weight of the polyurethane, (D) is dimethylolpropionic acid, which is present in the polyurethane in an amount of from about 2 wt % to about 6 wt % based on the total weight of the polyurethane, and (E) is sodium 2-[(2-aminoethyl)amino]ethanesulphonate, which is present in the polyurethane in an amount of from about 8 wt % to about 12 wt % based on the total weight of the polyurethane.

(A) Polyisocyanate(s)

In some examples, any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphtic polyisocyanate, either of which has a reduced tendency to yellow.

Some examples of polyisocyanates include hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, isophorone diisocyanate (IPDI), dicyclohexylmethane-4,4-diisocyanate (H12MDI), and combinations thereof.

The amount of the polyisocyanate in the polyurethane-based binder dispersion ranges from about 20 wt % to about 45 wt % of the total weight of the polyurethane-based binder dispersion. In an example, polyisocyanate makes up from about 25 wt % to about 35 wt % of the polyurethane binder.

(B) First Polyol(s)

The amount of component (b) (i.e., the first polyol) in the polyurethane-based binder dispersion can range from about 10 wt % to about 70 wt % of the total weight of the polyurethane-based binder dispersion. In an example, component (b) (i.e., the first polyol) can make up from about 30 wt % to about 60 wt % of the polyurethane binder.

The first polyol (b) can include any product having a chain with two hydroxyl groups at one end of the chain and no hydroxyl groups at the opposed end of the chain. The first polyol has a number average molecular weight ($M_e$) ranging from about 500 g/mol to about 5000 g/mol. Additionally, the first polyol has a glass transition temperature ($T_g$) ranging from about −20° C. to about 100° C. In an example, the glass transition temperature can range from about 0° C. to about 80° C.

The first polyol may be formed from the free radical polymerization of a monomer in the presence of a mercaptan that includes two hydroxyl functional groups or two carboxylic functional groups.

Without wishing to be bound by theory, the first polyol may contribute to the improved decap of an inkjet ink because the hydroxyl groups at one end of the chain of the polyol can be incorporated into the polyurethane backbone chain, while the group at the other end of the polyol forms a pendant group or pendant chain depending on what specific polyol is used. The first polyol may segregate in the aqueous ink, which renders the polyurethane binder readily dispersible (i.e., more stable) in the ink vehicle. The first polyol may also help prevent the polyurethane from swelling.

Some examples of the monomer used to form component (b) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate.

Some other examples of the monomer used to form component (b) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide.

Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (b) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H,1H,3H-hexafluorobutyl acrylate, 1H,1H,3H-tetrafluoropropyl methacrylate, 1H,1H,5H-octafluoropentyl methacrylate, 1H,1H,5H-octafluoropentyl acrylate, poly(dimethylsiloxane), methacryloxypropyl terminated polydimethylsiloxane DMS-R11 (made by Gelest Chemicals), and (3-acryloxy-2-hydroxypropoxypropyl) terminated polydimethylsiloxane DMS-U21 (made by Gelest Chemicals). It is to be understood that any combination of monomers listed for component (b) may be used.

Some examples of the mercaptan used to form component (b) include 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

In some examples, component (b) is formed from a free radical polymerization of a monomer in the presence of a mercaptan including two hydroxyl functional groups or two carboxylic functional groups. The monomer can be selected from methyl methacrylate, n-butyl acrylate, t-butyl methacrylate, t-butyl acrylate, 2-ethylhexyl acrylate, cyclohexyl methacrylate, benzyl methacrylate, isobornyl acrylate, ethoxyethyl acrylate, ethoxyethoxyethyl acrylate, methoxyethyl acrylate, methoxyethoxy methacrylate, hydroxyethyl (meth)acrylate, poly(ethyleneglycol) methyl ether (meth)acrylate ($M_w$ about 200 g/mol—about 500 g/mol), poly(ethyleneglycol) ethyl ether (meth)acrylate ($M_w$ about 200 g/mol—about 500 g/mol). The mercaptan can be 1,2-propanediol (thioglycerol).

In one example, component (b) may be formed by preparing a solution of the monomer and mercaptan in an organic solvent. When a combination of two monomers is used, the two monomers may be present in a ratio ranging from about 1:1 to about 9:1. In an example, methyl methacrylate and 2-ethylhexyl acrylate can be used in a combination of 9:1 respectively. When a combination of three monomers is used, the three monomers may be present in a ratio ranging from about 5:4:1 to about 10:8:3. In an example, methyl methacrylate, 2-ethylhexyl acrylate, and methacrylic acid ca be used in a combination of 7.5:2:0.5 respectively. Examples of other suitable monomer combinations used in forming component (b) may be found in Table 2 of the Examples section.

After the solution (including the monomer and the mercaptan) is prepared, the solution can be placed in an inert environment. For example, a flow of nitrogen gas may be introduced through the solution to create the inert environment. The solution may then be heated to a suitable temperature for polymerization, and the reaction may be allowed to occur for a suitable time. The time and temperature for polymerization can depend upon the monomer(s) and mercaptan(s) used. In an example, the polymerization temperature can be about 50° C. to about 90° C., and the reaction can be allowed to occur for from about 6 hours to about 12 hours. In another example, the polymerization temperature can be from about 65° C. to about 90° C.

The first polyol formed may include the mercaptan ranging from about 2 wt % to about 10 wt % based on the total weight of the first polyol. In an example, the mercaptan may make up about 5 wt % of the total weight of the first polyol.

(C) Second Polyol(s)

In some examples, the second polyol (i.e., component (c)) can be present in the polyurethane-based binder dispersion in an amount of from about 8 wt % to about 25 wt % based on the total weight of the polyurethane-based binder dispersion. In an example, component (b) (i.e., the first polyol) makes up from about 10 wt % to about 20 wt % of the polyurethane binder.

The second polyol(s) can have a number average molecular weight (Mn) of about 500 g/mol to about 3000 g/mol and have one hydroxyl group attached at each end of the polyol. Examples of second polyols include polyester polyols, polyether polyols, polycarbonate polyol, polyester-polycarbonate polyol, or mixtures thereof.

In some examples, the second polyol can be poly(propyleneglycol), poly(tetrahydrofuran), poly(carbonate) polyol, or mixtures thereof. Examples of polycarbonate polyol include polycarbonate polyols from Kuraray Co. Ltd. (e.g., C-590, C-1050, C-1090, C-2050, C-2090, and C-3090) and polycarbonate diols from UBE Industries, Ltd. (e.g., ETERNACOLL® UH-50, ETERNACOLL® UH-100, ETERNACOLL® UH-200, ETERNACOLL® PH-5-, ETERNACOLL® PH-100, ETERNACOLL® PH-200 and ETERNACOLL® UM90(1/3)).

(D) Carboxylic Acid Functional Group(s)

Component (d) can be a carboxylic acid functional group with two hydroxyl functional groups. The amount of component (d) in the polyurethane-based binder dispersion ranges from 1 wt % to about 10 wt % based upon the total weight of the polyurethane. In an example, component (d) makes up from about 2 wt % to about 6 wt % of the polyurethane binder.

The presence of component (d) assists in the ability of the polyurethane to be dissolved or dispersed in water after ionization with a base. As previously stated, component (d) can be a carboxylic acid. In some instances, component (d) includes two or more hydroxyl groups. Component (d) may have a number average molecular weight (Mn) of about 500 g/mol. Examples of component (d) may be derived from hydroxy-carboxylic acids having the general formula (HO)xQ(COOH)y, where Q is a straight or branched hydrocarbon radical containing 1 to 12 carbon atoms, and x is 2 or 3 and y ranges from 1 to 3.

Examples of component (d) can include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

(E) Sulfonic/Sulfonate Amine Compound(s)

In some examples, component (e) can be a compound shown in formula (1) below $$m(M^+) \; n(X)-R-Y \quad (1)$$

wherein m is 0 or 1;

M is a metal;

n is 2 to 10;

X is an amino group,

R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$.

In some examples, m is 1; M is sodium, potassium, magnesium, calcium, or lithium; n is 2 to 4; X is an amino group; R is a C1 to C8 alkyl group; and Y is $SO_3^-$.

In some examples, the sulfonate or sulfonic acid amine compound (i.e., component (e)) can have two or more amino functional groups. In some examples, sulfonate or sulfonic acid amine compound (i.e., component (e)) can have two to ten amino functional groups. In some examples, sulfonate or sulfonic acid amine compound (i.e., component (e)) can have two to four amino functional groups. In some examples, sulfonate or sulfonic acid amine compound (i.e., component (e)) can have two amino functional groups.

The polyurethane-based binder dispersion disclosed herein, which may include component (e), improves the decap performance and print reliability of the inkjet ink including the dispersion while improving image quality. Component (e) may be present in the polyurethane-based binder dispersion an amount ranging from about 1 wt % to about 20 wt % based upon the total weight of the polyurethane-based binder dispersion. In an example, component (e) can be present in an amount ranging from about 2 wt % to about 20 wt % of the polyurethane-based binder dispersion. In another example, component (e) may be present in an amount of about 5 wt % to about 15 wt % of the polyurethane-based binder dispersion.

Some examples of component (e) include ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2-aminoethyl)amino]-1-propanesulfonic acid or a salt thereof, 2-[bis(2-aminoethyl)amino]-ethanesulfonic acid or a salt thereof, 2-[(2-aminoethyl)amino]-1-propanesulfonic acid or a salt thereof, 2-[[2-[(1-methylethyl)amino]ethyl]amino]-ethanesulfonic acid or a salt thereof, 2-[(2-aminoethyl)amino]-1-pentanesulfonic acid or a salt thereof, or mixtures thereof.

In some examples, component (e) is a compound shown in Table 1 below.

TABLE 1

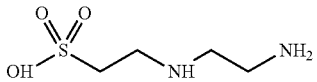  I

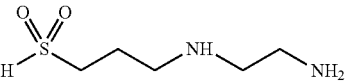  II

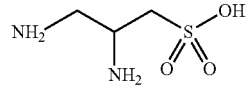  III

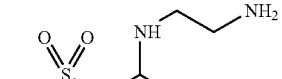  IV

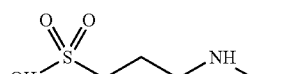  V

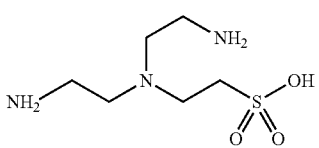 [SMILES: NCCN(CCN)CCS(=O)(=O)O]  VI

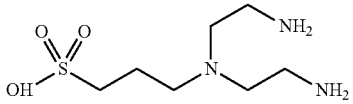 [SMILES: NCCN(CCN)CCCS(=O)(=O)O]  VII

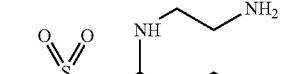  VIII

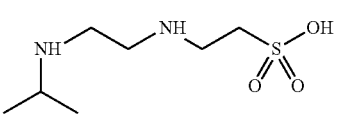  IX

In some examples, component (e) can be sodium 2-[(2-aminoethyl)amino]ethanesulphonate or sodium diaminoethylpropylsulfonate.

(F) Homopolymer(s) or Copolymer(s) of Poly(Ethylene Glycol)

In some examples, component (f) can be a homopolymer or copolymer of poly(ethylene glycol) having one hydroxyl functional group or one amino functional group. In other examples, component (d) may be a homopolymer or copolymer of poly(ethylene glycol) having two hydroxyl functional groups or two amino functional groups at one end of its chain.

The homopolymer or copolymer of poly(ethylene glycol) has a number average molecular weight (Mn) ranging from about 500 g/mol to about 5,000 g/mol. In another example, the homopolymer or copolymer of poly(ethylene glycol) has a number average molecular weight (Mn) ranging from about 500 g/mol to about 3,000 g/mol. Component (f) also has a water solubility of greater than 30% v/v (volume of poly(ethylene glycol) to volume of water).

Examples of the polyurethane-based binder dispersion disclosed herein including component (f) can increase the gloss and optical density of a printed image on media when compared to the gloss and optical density of a printed image on the same media formed with an ink that includes other types of polyurethane dispersions that do not include component (f). This may be due, in part, because, when included, component (f) prevents the polyurethane-based binder dispersion from reacting with an underlying pre-treatment fixing fluid, which would otherwise cause the polyurethane binder to undesirably coagulate when the ink composition is applied to the medium. As such, component (f) renders the polyurethane-based binder dispersion insensitive to the pre-treatment fixing fluid, and thus prevents undesirable polyurethane coagulation. As the polyurethane-based binder does not strongly interact with the pre-treatment fixing fluid to cause coagulation, the polyurethane can form a film when printed, which advantageously affects the gloss and optical density of the printed image.

The amount of component (f) in the polyurethane-based binder dispersion ranges from 0 wt % to about 20 wt % based upon the total weight of the polyurethane-based binder dispersion. In an example, component (f) can be present in the polyurethane-based binder dispersion in an amount of from about 5 wt % to about 10 wt % of the polyurethane-based binder dispersion.

Any copolymer of poly(ethylene glycol) with one or two hydroxyl and/or amino group(s) may be used as component (f), as long as the copolymer has water solubility of > about 30% v/v and a suitable number average molecular weight. Some examples of suitable copolymers for component (f) include a copolymer of poly(ethylene) and poly(ethylene glycol) with one hydroxyl functional group (e.g., 

where m=1-10 and n=5-50, a copolymer of poly(propylene glycol) and poly(ethylene glycol) with one hydroxyl functional group, and a copolymer of poly(ethylene glycol) and poly(propylene glycol) with one amino functional group.

Some commercially available examples of the copolymer of poly(ethylene glycol) and poly(propylene glycol) with one amino functional group include JEFFAMINE® M-1000

(i.e., 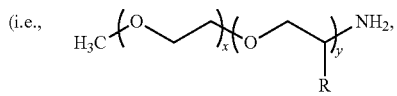

where x=19 and y=3) and JEFFAMINE® M-2070

(i.e., 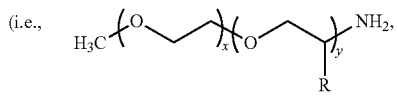

where x=31 and y=10) (both produced by Huntsman Chemicals).

Some additional examples of component (f) include a poly(ethylene glycol) homopolymer, such as monoamine terminated poly(ethylene glycol)

(i.e., 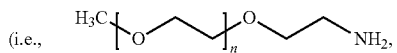

where n=5-100, and a poly(ethylene glycol) mono alkyl ether. Examples of the poly(ethylene glycol) mono alkyl ether include an alkyl group with C1 to C8 straight or branched hydrocarbons, such as methyl, ethyl, and butyl groups. Examples of the poly(ethylene glycol) mono alkyl ether include poly(ethylene glycol) monomethyl ether (i.e., 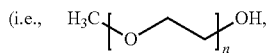

where n=5-100, poly(ethylene glycol) monoethyl ether, poly(ethylene glycol) monopropyl ether, and poly(ethylene glycol) monobutyl ether.

Furthermore, any homopolymer of poly(ethylene glycol) with two hydroxyl or amino groups at one end of the polymer chain may alternatively be used as component (f), as long as the homopolymer has water solubility of > about 30% v/v and a suitable number average molecular weight. As an example, the homopolymer may be two hydroxyl terminated poly(ethylene glycol), where both hydroxyls are located at one end of the chain. One commercially available example is YMER™ N120 (a linear difunctional polyethylene glycol monomethyl ether from Perstorp).

Method(s) of Making the Polyurethane-Based Binder Dispersion(s)

In an example of the first step of the method for making the polyurethane binder dispersion, components (A), (B), (C), and (D) can be mixed in a reactor with an organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, zinc neodecanote and 1,4-diazabicyclo[2.2.2]octane). The reactor may be maintained at a constant temperature and under a dry air mixture. The components may be mixed and the polymerization reaction may be allowed to occur until the % NCO reaches the theoretical value. In an example, the reaction time ranges from about 4 hour to about 14 hours. In another example, the polymerization reaction can occur for about 10 hours at about 60° C. to achieve the theoretical value of the % NCO.

In an example of the second step of the method for making the polyurethane polymer, component (F) can then be added to the polymerization reaction of components (A), (B), (C), and (D). Polymerization can be continued until the % NCO reaches the theoretical value. In this step, the polymerization reaction may be allowed to occur for a time ranging from about 1 hour to about 4 hours. In an example, the polymerization reaction can occurs for about 2 hours at about 60° C. to achieve the theoretical value of the % NCO.

In an example of the third step of the method for making the polyurethane polymer, component (E) can be dissolved in one equivalent of a base and a sufficient amount of deionized water to fully dissolve component (E). Some examples of the base include ammonia, trimethylamine, triethylamine, sodium hydroxide, potassium hydroxide, and lithium hydroxide. The polymer solution made from components (A), (B), (C), and (D) and in some instances (F) can be cooled to a temperature ranging from about 30° C. to about 50° C. The aqueous solution of component (E) can be added to the polymer solution from the first step (if component (F) is not included) or the second step (if component (F) is included) with vigorous mixing at a temperature ranging from about 30° C. to about 50° C. for at least about 30 minutes.

In an example of the fourth step of the method for making the polyurethane polymer comprising components (A)-(E) and optionally (F), the polyurethane solution may be added to water including a base slowly (e.g., over a 10 minute period) with vigorous agitation or vice versa. The mixture may be stirred and organic solvent may be removed by distillation to form the polyurethane binder dispersion. In an example, the acid number of the polyurethane-based binder dispersion ranges from about 10 mg KOH/g solid resin to about 70 mg KOH/g solid resin or from about 30 mg KOH/g solid resin to less than 60 mg KOH/g solid resin.

Once the polyurethane-based binder dispersion is prepared, the particle size of the polyurethane-based binder in the dispersion ranges from about 10 nm to about 200 nm. In an example, the particle size of the polyurethane binder ranges from about 10 nm to about 100 nm.

In some examples, the polyurethane-based binder dispersion can include from about 10 wt % to about 95 wt % water based on the total weight of the polyurethane-based binder dispersion.

Inkjet Ink(s)

The inkjet ink, which includes the polyurethane-based binder dispersion disclosed herein, may be included in a single cartridge ink set or a multiple-cartridge ink set (which may or may not include the pre-treatment fixer fluid). In the multiple-cartridge ink set, any number of the multiple inks may have the polyurethane binder incorporated therein.

In an example, the inkjet ink disclosed herein can include a co-solvent (in addition to any water that is present), a colorant, water (which is the main solvent), a surfactant, and the polyurethane-based binder dispersion.

In some examples, an inkjet ink composition can comprise water; at least one co-solvent; at least one surfactant; at least one colorant; and a polyurethane-based binder dispersion. The polyurethane-based binder dispersion can comprise: water and a polyurethane, wherein the polyurethane can comprise:

component (A), which is isophorone diisocyanate and is present in the polyurethane in an amount of from about 24 wt % to about 30 wt % based on the total weight of the polyurethane, component (B), which is a copolymer of methyl methacrylate-co-ethylhexylacrylate-co-ethoxyethoxyethylacrylate with two hydroxy groups at one end and is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B), component (C), which is polypropylene glycol with a $M_n$ of 1000 g/mol and is present in the polyurethane in an amount of from about 12 wt % to about 18 wt % based on the total weight of the polyurethane, component (D), which is dimethylolpropionic acid and is present in the polyurethane in an amount of from about 2 wt % to about 6 wt % based on the total weight of the polyurethane, and component (E), which is sodium 2-[(2-aminoethyl)amino]ethanesulphonate and is present in the polyurethane in an amount of from about 8 wt % to about 12 wt % based on the total weight of the polyurethane.

Colorant(s)

The colorant(s) in the inkjet ink composition(s) described herein can include inorganic pigments, organic pigments, dyes, and combinations thereof.

The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the BLACK PEARLS® series, REGAL® series, the MOGUL® series, or the MONARCH® series manufactured by Cabot Corporation, Boston, Mass., (such as, e.g., BLACK PEARLS® 880 Carbon Black, REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

In some examples, the above pigments can be used alone or in any combination with one another.

The total amount of the colorant(s) in the inkjet ink composition ranges from about 0.1 wt % to about 15 wt % based on the total weight of the inkjet ink composition. In some examples, the total amount of the colorant(s) in the inkjet ink composition ranges from about 1 wt % to about 8 wt % based on the total weight of the inkjet ink composition. The average particle size of these colorant(s) may range from about 80 nm to about 400 nm.

Colorant(s) in a Dispersion

In the examples disclosed herein, the pigment may be dispersed by an anionic polymer (i.e., anionic polymeric dispersant). The dispersant may be present in an amount ranging from about 0.1 wt % to about 5 wt % of a total weight of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

Co-Solvent(s)

In some examples, the co-solvents in the inkjet ink compositions can include aliphatic alcohols, aromatic alcohols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

Specific examples of certain co-solvents that may likewise be used include, but are not limited to, hydantoin glycol (such as, e.g., 1,3-bis-(2-hydroxyethyl)-5,5-dimethylhydantoin), 1,(2-hydroxyethyl)-2-pyrrolidinone, 1-(2-hydroxyethyl)-2-imidazolidinone, tetratethylene glycol, 1,2,6-hexanetriol, glycerol, glycerol propoxylate, 1,5-pentanediol, LIPONIC® ethoxylated glycerol 1 (LEG-1), LIPONIC® ethoxylated glycerol 7 (LEG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, the like, or combinations thereof.

Co-solvents can be added to reduce the rate of evaporation of water in the inkjet ink, to minimize clogging, or provide other improved properties related to viscosity, pH, surface tension, optical density, gamut, durability, decap, and print quality, for example.

The co-solvents can be present in the inkjet ink compositions in amounts ranging from about 1 wt % to about 40 wt % (based on the total weight of the inkjet ink composition), depending, at least in part, on the jetting architecture.

Surfactant(s)

Surfactant(s) can be added to inkjet ink composition(s) in some examples. The surfactants in the inkjet ink compositions may include nonionic, cationic, and/or anionic surfactants, which may be present in amounts ranging from about 0.1 wt % to about 10 wt % based on the total weight of the inkjet ink composition. In some examples, the inkjet ink composition can include surfactants in amounts ranging from about 0.1 wt % to about 5 wt % based on the total weight of the inkjet ink composition.

In some examples, the inkjet ink compositions can include ethoxylated alcohols such as those from the Tergitol® series (e.g., Tergitol® 15S30, or Tergitol® 15S9), manufactured by Dow Chemical; surfactants from the Surfynol® series (e.g., Surfynol® 104, Surfynol® 440 and Surfynol® 465), and Dynol™ series (e.g., Dynol™ 360, Dynol™ 604, and Dynol™ 607) manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; alkoxylated surfactant such as Tego® Wet 510 manufactured from Evonik; fluorinated PolyFox® nonionic surfactants (e.g., PF159 nonionic surfactants), manufactured by Omnova; or combinations thereof.

Polysorbate surfactants can include Polysorbate 20 (or polyoxyethylene 20 sorbitan monolaurate), Polysorbate 40 (or polyoxyethylene 20 sorbitan monopalmitate), Polysorbate 60 (or polyoxyethylene 20 sorbitan monostearate), Polysorbate 80 (or polyoxyethylene 20 sorbitan monooleate), or the like. However, not all of these polysorbates have at least 50 wt % lipophilic oleic acid groups and having an HLB value of less than 15. Brand names for these polysorbate surfactants include those sold under the tradename Tween® or Alkest®. Regarding the nomenclature of these polysorbates, the number "20" following "polyoxyethylene" refers to the total number of oxyethylene—(CH2CH2O)— groups found in the molecule. The number 20, 40, 60, or 80 following "polysorbate" is related to the type of fatty acid associated with the polyoxyethylene sorbitan portion. Monolaurate is indicated by 20, monopalmitate is indicated by 40, monostearate by 60 and monooleate by 80.

Other polysorbates can likewise be used, including Polysorbate 85, or Tween® 85, which is polyethylene glycol sorbitan trioleate; or Polysorbate 81, or Tween® 81, which is a polyoxyethylene (5) sorbitan monooleate. Tween® 85 and Tween® 81 are oleyl type compounds and include 70 wt % oleic acid. Polyoxyethylene sorbitan dioleate can also be used.

Another surfactant that can be used includes polyoxyethylene glycol ethers. Examples surfactants that can be used include Brij® S, Brij® O, Brij® C, and Brij® L type surfactants Synperonic surfactants can also be used. Specific examples include Brij® S10, Brij® S5, Brij®, S15, Brij® S20, Brij® S2/93, Brij® S7, Brij® 98/O20, Brij® O10, Brij® O2, Brij®, O3, Brij® O5, Brij® C2, Brij® C7, Brij® C10, Brij®, C20, Brij® L4/30, Brij® L9, Brij® L15, Synperonic® 91-2.5, Synperonic® 91-2.5, Synperonic® 91-10, or mixtures thereof.

Additive(s)

The additives in the inkjet ink compositions can be selected from the group consisting of anti-kogation agents, pH adjusters, antimicrobial agents, sequestering agents, viscosity modifiers, humectants, penetrants, wetting agents, preservatives, jettability additives, waxes, and mixtures thereof.

Kogation refers to the deposit of dried ink on a heating element of a thermal inkjet printhead. Anti-kogation agent(s) is/are included to assist in preventing the buildup of kogation. Anti-kogation agents can include an anionic surfactant, a nonionic surfactant, a zwitterionic surfactant, an amphoteric surfactant, or mixtures thereof. A list of surfactants is given above. In some examples, the anti-kogation agents can include oleth-3-phosphate (commercially available as CRODAFOS® O3A or CRODAFOS® N-3 acid) or dextran 500 k. The anti-kogation agent may be present in the inkjet ink composition in an amount ranging from about 0.1 wt % to about 3 wt % of the total weight of the inkjet ink composition.

pH adjuster(s) can be added to the inkjet ink compositions in some examples. pH adjuster(s) can include sodium hydroxide, potassium hydroxide, ammonia, hydrochloric acid, nitric acid, sulfuric acid, and (poly)alkanolamines such as triethanolamine and 2-amino-2-methyl-1-propaniol, or mixtures thereof.

In some examples, the inkjet ink composition may also include antimicrobial agent(s). Suitable antimicrobial agents include biocides and fungicides. Examples of antimicrobial agents include ACTICIDE® M20 (i.e., active ingredient is 2-methyl-4-isothiazolin-3-one), ACTICIDE® B20 (i.e., active ingredient is 1,2-benzisothiazolin-3-one), AMP (i.e., amino-tris-(methylene phosphonate), TRIS (i.e., tris(hydroxymethyl)nitromethane), and mixtures thereof. Other examples of antimicrobial agent(s) include NUOSEPT® (Ashland Inc.), UCARCIDE™ or KORDEK™ (Dow Chemical Co.), and PROXEL® (Arch Chemicals) series, and combinations thereof.

In some examples, sequestering agents can be added to the inkjet ink compositions. These sequestering agents may be useful to impart improved stability characteristics to the inkjet ink composition and can include an alkali metal, an alkaline earth metal, and an ammonium salt of a linear aliphatic substituted glycine compound. The term "linear aliphatic substituted glycine" designates glycine compounds in which the amino group of glycine has been substituted with linear aliphatic groups. In some examples, the sequestering agents may include the alkali metal (e.g., sodium), alkaline earth metal (e.g., calcium) and ammonium salts of ethylene diamine tetraacetic acid, nitrilo triacetic acid, diethylene triamine pentaacetic acid, hydroxyethylene diamine triacetic acid, dihydroxyethyl glycine, iminodiacetic acid and ethanol diglycine. Similar salts of other linear aliphatic substituted glycine compounds may also be used.

In some examples, viscosity modifiers can be added to the inkjet ink compositions. Examples of viscosity modifiers include aliphatic ketones, stearone, 2-hydroxybenzyl alcohol, 4-hydroxybenzyl alcohol, 4-nitrobenzyl alcohol, 4-hydroxy-3-methoxy benzyl alcohol, 3-methoxy-4-nitrobenzyl alcohol, 2-amino-5-chlorobenzyl alcohol, 2-amino-5-methylbenzyl alcohol, 3-amino-2-methylbenzyl alcohol, 3-amino-4-methyl benzyl alcohol, 2 (2-(aminomethyl)phenylthio)benzyl alcohol, 2,4,6-trimethylbenzyl alcohol, 2-amino-2-methyl-1,3-propanediol, 2-amino-1-phenyl-1,3-propanediol, 2,2-dimethyl-1-phenyl-1,3-propanediol, 2-bromo-2-nitro-1,3-propanediol, 3-tert-butylamino-1,2-propanediol, 1,1-diphenyl-1,2-propanediol, 1,4-dibromo-2, 3-butanediol, 2,3-dibromo-1,4-butanediol, 2,3-dibromo-2-butene-1,4-diol, 1,1,2-triphenyl-1,2-ethanediol, 2-naphthalenemethanol, 2-methoxy-1-naphthalenemethanol, decafluoro benzhydrol, 2-methylbenzhydrol, 1-benzeneethanol, 4,4'-isopropylidene bis(2-(2,6-dibromo phenoxy)ethanol), 2,2'-(1,4-phenylenedioxy)diethanol, 2,2-bis (hydroxymethyl)-2,2',2"-nitrilotriethanol,
di(trimethylolpropane), 2-amino-3-phenyl-1-propanol, tricyclohexylmethanol, tris(hydroxymethyl)aminomethane succinate, 4,4'-trimethylene bis(1-piperidine ethanol), N-methyl glucamine, or mixtures thereof.

In some examples, the inkjet ink compositions described herein may contain a high-boiling water-soluble organic solvent, which can serve as a wetting agent or humectant for imparting water retentivity and wetting properties to the inkjet ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 g/mol or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol, or combinations thereof.

In some examples, the inkjet ink compositions may also contain penetrants for accelerating penetration of the inkjet ink composition into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, dipropylene glycol mono-n-butyl ether, or combinations thereof. Examples of 1,2-alkyldiols can include 1,2-pentanediol, 1,2-hexanediol, or combinations thereof. The penetrant may also be selected from straight-chain hydrocarbon diols, such as 1,3-propanediol, 1,4-butanediol, 1,5-pentanediol, 1,6-hexanediol, 1,7-heptanediol, 1,8-octanediol, and combinations thereof. Glycerol may also be used as a penetrant.

In some examples, the inkjet ink compositions can contain preservatives. Specific examples of preservatives can include dichlorophene, hexachlorophene, 1,2-benzothiazolin-3-one, 3,4-isothiazolin-3-one, or 4,4-dimethyl oxazolidine, alkyl isothiazolone, chloroalkyl isothiazolone, benzoisothiazolone, bromonitroalcohol, chloroxylenol, or mixtures thereof.

In some examples, the inkjet ink compositions can include jettability additives. Jettability additives can include LIPONIC® EG-1 (ethoxylated glycerol; available from Vantage Specialty Ingredients, Inc.).

In some examples, the inkjet ink compositions can include a wax. Wax emulsions are commercially available from a number of vendors, for example Keim-Additec, Lubrizol, Michelman, and BYK Chemie. Wax emulsions that can be useful in this invention include but are not limited to: Lubrizol: LIQUILUBE™ 411, LIQUILUBE™ 405, LIQUILUBE™ 488, LIQUILUBE™ 443, LIQUILUBE™ 454; Michelman: ME80825, ME48040, ME98040M1, ME61335, ME90842, ME91240, ML160, Keim-Additec: ULTRALUBE® E-521/20, ULTRALUBE® E-7093, ULTRALUBE® 7095/1, ULTRALUBE® E-8046, ULTRALUBE® E-502V, ULTRALUBE® E-842N: Byk: AQUACER® 2650, AQUACER® 507, AQUACER® 533, AQUACER® 515, AQUACER® 537, AQUASLIP™ 671, AQUASLIP™ 942.

The additive(s) can be added singularly or in various combinations to the inkjet ink compositions described herein in total amounts of from about 0.1 wt % to about 10 wt % based on the total weight of the inkjet ink composition.

Water

The inkjet ink compositions described herein also include water (e.g., deionized water) in amounts to make up the balance of the inkjet ink compositions. In some examples, water can be present in the inkjet compositions in amounts from about 30 wt % to about 90 wt % based on the total weight of the inkjet ink composition. In other examples, the inkjet ink composition can include from about 40 wt % to about 85 wt % water. In further examples, the inkjet ink composition can include from about 50 wt % to about 80 wt % water.

Using Polyurethane-Based Binder Dispersion and/or Inkjet Ink(s)

In some examples, a method of using the polyurethane-based binder dispersion described herein is disclosed. This method of using can comprise adding the polyurethane-based binder dispersion to an inkjet ink composition comprising water, at least one colorant, at least one co-solvent, and at least one surfactant. In some examples, the method of using the polyurethane-based binder dispersion can further optionally comprise applying the inkjet ink composition containing the polyurethane-based binder dispersion to a media substrate.

After the ink is prepared, the ink(s) may be used by applying to a medium using any inkjet printer (e.g., thermal or piezoelectric). In an example, the ink(s) may be applied to a coated offset medium. A coated offset medium can be any paper coated to impart better image quality by providing some degree of surface gloss, smoothness, and reduced ink absorbency. Examples of commercially available coated offset media include Sterling® Ultra Gloss (NewPage Corp.) and UTOPIA® (Appleton Coated LLC). In other examples, the medium may be coated or uncoated paper. The medium may also be a vinyl or plastic material.

In some examples, the media or printing surface can include substrates made from paper, metal, plastic, fabric, or combinations thereof. In some examples, the media or printing surface can include plain papers, microporous photopapers, coated papers, glossy photopapers, semi-gloss photopapers, heavy weight matte papers, billboard papers, digital fine art papers, calendared papers, vinyl papers, or combinations thereof.

The inkjet ink may be paired with a pre-treatment fixing fluid in an inkjet ink set. In some instances, a pre-treatment fixing fluid may be applied to the medium prior to printing the inkjet ink onto the medium. The pre-treatment fixing fluid is described in greater detail below.

The pre-treatment fixing fluid may be suitable for wet-on-wet printing on the coated offset media. The pre-treatment fixing fluid includes a particular combination of salts (at a desirably low content), a particular co-solvent, and a low HLB (hydrophilic-lipophilic balance) surfactant that is capable of dynamically lowering the surface tension of the pre-treatment fluid. In the examples disclosed herein, the HLB is less than 10. The selected salt(s), solvent, and surfactant together may advantageously promote dot gain and reduce feathering and pigment flotation, resulting in higher quality text prints. The composition of the pre-treatment fixing fluid disclosed herein also exhibits desirable pen reliability.

As mentioned above, the pre-treatment fixing fluid disclosed herein includes calcium propionate, calcium pantothenate, tetraethylene glycol, a low HLB surfactant, an acid, and a balance of water. In some examples, the pre-treatment fixing fluid consists of these components alone, and in other examples, the pre-treatment fixing fluid includes these components and an antimicrobial agent.

The combination of calcium propionate and calcium pantothenate provides the pre-treatment fixing fluid with metal salts that may cause the pigment or colorant in the ink deposited thereon to coagulate, and that may control pigment migration/flotation. The calcium propionate may be present in an amount ranging from greater than 4.5 wt % to about 8.0 wt % based on the total weight of the pre-treatment fluid. The calcium pantothenate may be present in an amount ranging from about 2.0 wt % to 15 wt % or less. In an example, the pre-treatment fixing fluid may include about 6.5 wt % of calcium propionate and about 4.8 wt % of calcium pantothenate. The amount of the metal salts is believed to be high enough to achieve the desired fixing effect without deleteriously affecting pen reliability.

The pre-treatment fixing fluid also includes tetraethylene glycol as a co-solvent. The tetraethylene glycol may be present in total in the pre-treatment fixing fluid in a range from about 0.1 wt % to about 30 wt %. The amount used may depend, at least in part, on the jetting architecture used to apply the pre-treatment fixing fluid. In an example, the amount of tetraethylene glycol used can be about 12 wt %.

The pre-treatment fixing fluid also includes the low HLB surfactant. This type of surfactant is capable of dynamically controlling, in particular, lowering, the surface tension of the pre-treatment fixing fluid. The low HLB surfactant may provide the pre-treatment fluid, at the time of its application, with a surface tension that is lower than the surface energy of the coated offset medium upon which the pre-treatment fixing fluid is being applied. As such, the contact angle between the pre-treatment fixing fluid and the medium is zero (0), which enables the pre-treatment fixing fluid to spread out across the medium surface in a horizontal direction (with respect to the medium surface), and effectively wet and reduce the surface energy of the offset coated medium.

Examples of the low HLB surfactant are a self-emulsifiable wetting agent based on acetylenic diol chemistry (e.g., SURFYNOL® SE-F) or a nonionic, alkylphenylethoxylate and solvent free surfactant (e.g., CARBOWET® GA-211 surfactant, a.k.a. SURFYNOL® CT-211, from Air Products and Chemicals, Inc.). The low HLB surfactant can be present in the pre-treatment fixing fluid in an amount ranging from about 0.01 wt % to about 1.0 wt % based on the total weight of the pre-treatment fixing fluid. In an example, the amount of the surfactant can be about 0.05 wt %. It is believed that the desired surface tension may not be obtainable with other amounts and/or other surfactants.

In some examples, the pre-treatment fixing fluid may also include an antimicrobial agent. Antimicrobial agent(s), such as biocides and fungicides, may be added to inhibit the growth of harmful microorganisms. Example antimicrobial agents may include the NUOSEPT® (Ashland Inc.), UCAR-CIDE® or KORDEK® (Dow Chemical Co.), and PROXEL® (Arch Chemicals) series, and combinations thereof. A total amount of the antimicrobial agents in the pre-treatment fixing fluid may range from about 0.05 wt % to about 1 wt %. In an example, the pre-treatment fixing fluid includes about 0.1 wt % of a biocide.

The balance of the pre-treatment fixing fluid can be water. In addition, buffer(s) may be used to adjust the pH of the pre-treatment fixing fluid to a particular pH. One example of a buffer is methanesulfonic acid. In some examples, the buffer may be used in an amount sufficient to buffer the pH of the pre-treatment fixing fluid so that it ranges from 4.0 to 7.0. In an example, the pH of the pre-treatment fixing fluid can be adjusted to about 6.6 using methanesulfonic acid.

As described above, the surface tension of the pre-treatment fixing fluid is lower than the surface energy of the offset coated medium so that when the pre-treatment fixing fluid is applied on the surface of the offset coated medium, the contact angle between the pre-treatment fixing fluid and the offset coated medium is 0. In an example, the surface tension of the pre-treatment fixing fluid is below 37 dyne/cm. In another example, the surface tension of the pre-treatment fixing fluid ranges from about 30 dyne/cm to about 33 dyne/cm. In still another example, the surface energy of the coated offset medium ranges from about 34 dyne/cm to about 42 dyne/cm, and the surface tension of the pre-treatment fixing fluid is about 33 dyne/cm or lower.

The pre-treatment fixing fluid may be applied onto the medium using any suitable high speed (e.g., from about 50 fpm to about 1000 fpm) inkjet printing apparatus, including thermal inkjet printers or web presses, piezoelectric inkjet printers or web presses, continuous inkjet printers or web presses.

In an example, the amount of pre-treatment fixing fluid that is applied to the medium ranges from about 1 gsm to about 7 gsm.

In the examples disclosed herein, no drying operation is performed after the pre-treatment fixing fluid is applied on the medium. Rather, while the pre-treatment fixing fluid is wet, the inkjet ink disclosed herein is deposited on the pre-treatment fixing fluid on the medium. When multiple ink colors are used, it is to be understood that all of the inks are applied while previously deposited layers are still wet. The ink(s) is also formulated to be deposited by the inkjet printing system.

The salts present in the pre-treatment fixing fluid instantaneously react with the colorant present in the ink, causing the pigment to crash out of ink and fixing the pigment on the medium surface. In addition, the applied pre-treatment fixing fluid provides the coated offset medium with a reduced surface energy, which causes the deposited ink(s) to spread less than if the surface energy were higher. This contributes to bleed control and dot gain, and thus enhances the print quality attributes. This benefit is in addition to the benefits obtained from the instantaneous fixing of the colorant(s) in the ink by the salts in the pre-treatment fixing fluid.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

To further illustrate the present disclosure, examples are given herein. It is to be understood that these examples are provided for illustrative purposes and are not to be construed as limiting the scope of the present disclosure.

If a standard test is mentioned herein, unless otherwise stated, the version of the test to be referred to is the most recent at the time of filing this patent application.

All amounts in the examples below are in wt % unless indicated otherwise.

EXAMPLES

Ingredients and Abbreviations
C: comparison.
I: invention.
M2070: is a copolymer of poly(ethyleneglycol-co-propyleneglycol) from Hunstman Chemical.
BGDA: is bisphenol A glycerolate dimethacrylate.
BPAE: bisphenol A ethoxylate (M, 290 g/mol).
CXP-2716: is polycarbonate polyol from Covestro.
PTMG1K: is poly(tetrahydrofuran) polyol with $M_n$=1000 g/mol.
C-1090: is poly(carbonate) polyol with $M_n$=1000 g/mol (from Kuraray).
C-590: is poly(carbonate) polyol with $M_n$=500 g/mol.
ETERNACOLL® UH-50: is polycarbonate diol.
PLACCEL™ CD205: is polycaprolactone diol.
PPG1K: is poly(propyleneglycol) with $M_n$=1000 g/mol.
Taurine: is 2-aminoethanesulfonic acid.
EPS: is sodium diaminoethylpropylsulfonate (from Raschig).
VESTAMIN® A-95: is sodium diaminoethylethylsulfonate (from Evonik).
MMA: is methyl methacrylate.
BA: is n-butyl acrylate.
EHA: is 2-ethylhexylacrylate.
MAA: is methacrylic acid.
TBA: is t-butyl acrylate.
TBMA: is t-butyl methacrylate.
BzMA: is benzyl methacrylate.
VA: is vinylacetate.
CHMA: is cyclohexyl methacrylate.
THFM: is tetrahydrofuran methacrylate.
EOEOA: is ethoxyethoxyethylacrylate.
PPOM-375: is poly(propyleneglycol) methacrylate ($M_w$ 375 g/mol).
MPEG-480: is poly(ethyleneoxide) methacrylate ($M_w$ 480 g/mol).
MPEG-350: is poly(ethyleneglycol) methyl ether acrylate ($M_w$ 350 g/mol).
EOEO: is di(ethyleneglycol) ethyl ether acrylate.
TEGMA: is methyl triethylenglycol methacrylate.
Oe: is ethylethoxylacrylate.
AIBN: is azobisisobutylonitrile.
DBTDL: is dibutyl tin dilaurate.
AN: is acrylonitrile.
IBM: is isobutyl methacrylate.
IBA: is isobutyl acrylate.
Sty: is styrene.
TFMA: is tetra-hydrofurfuryl methacrylate.
DMPA: is 2,2-bis(hydroxymethyl)propionic acid.
MEHQ: is hydroquinone monomethyl ether.
DAA: is 2-(dimethylamino)ethyl acrylate.
HDI: is hexamethylene-1,6-diisocyanate.
PTMG1K: is polytetramethylene glycol ($M_w$ is 1000 g/mol).
PPG1K: is polypropylene glycol ($M_w$ is 1000 g/mol).
PPG725: is polypropylene glycol ($M_w$ is 725 g/mol).

Example 1

Various polyols used in the examples below were synthesized in the same manner. As an example, Polyol-53, was synthesized as follows:
1. 600 grams of MMA, 120 grams of EHA, 80 grams of ethoxyethoxyethylacrylate, 40 grams of thioglycerol, 8 grams of AIBN, and 600 grams of acetone were mixed in a beaker until the solution became homogeneous.
2. The solution was purged with nitrogen for 20 minutes. A 2-liter four neck round bottom flask equipped with a mechanical stirrer, a condenser and a nitrogen inlet was immersed in a constant temperature water bath at 75 C.
3. The solution containing the monomers (MMA, EHA, and EOEO), mercaptan (i.e., thioglycerol), and 2-2'-AIBN was pumped into the reactor (i.e., the flask) for about two hours. The polymerization continued for about ten more hours after the addition of the solution.
4. A viscous polymer solution was obtained. The number average molecular weight ($M_n$) of the viscous polymer was 1800 g/mol. The weight average molecular weight ($M_w$) of the viscous polymer was calculated to be 2400 g/mol using Gel Permeation Chromatography. The % solid was 78%.
5. Each of the other example polyols was prepared in a similar manner as described for Polyol-53, using the components and amounts set forth in Table 2 below.

TABLE 2

| | Monomers | Ratio |
|---|---|---|
| Polyol-2 | MMA/BA | 50/51 |
| Polyol-7 | MMA/EHA | 75/25 |
| Polyol-8 | MMA/EHA | 50/50 |
| Polyol-9 | MMA/EHA | 90/10 |
| Polyol-10 | MMA/EHA/MAA | 50/40/10 |
| Polyol-12 | MMA/EHA | 50/50 |
| Polyol-13 | Allyl Methacrylate/EHA | 70/30 |
| Polyol-14 | MMA/EHA | 75/25 |
| Polyol-14 | MMA/EHA | 75/25 |
| Polyol-20 | MMA/EHA/DAA | 70/25/5 |
| Polyol-22 | IBM/BA | 65/35 |
| Polyol-23 | CHMA/EHA | 80/20 |
| Polyol-24 | BzMA/EHA | 95/5 |
| Polyol-25 | MMA/EHA | 75/25 |
| Polyol-26 | t-BA/BMA | 80/20 |
| Polyol-30 | CHMA/EHA | 95/5 |
| Polyol-31 | IBA/MMA/BA | 20/57/23 |
| Polyol-32 | IBA/MMA/BA | 40/38/22 |
| Polyol-34 | BzMA/MMA/BA | 20/60/20 |
| Polyol-35 | BzMA/MMA/BA | 40/44/16 |
| Polyol-36 | CHMA/MMA/BA | 20/57/23 |
| Polyol-37 | CHMA/MMA/BA | 40/38/22 |
| Polyol-38 | IBA/MMA/EHA | 20/57/23 |
| Polyol-39 | Sty/BMA | 40/60 |

TABLE 2-continued

| | Monomers | Ratio |
|---|---|---|
| Polyol-41 | TFMA/MMA/BA | 10/65/25 |
| Polyol-43 | MMA/EHA/PPOM-375 | 75/15/10 |
| Polyol-45 | MMA/EHA/MPEG-480 | 75/20/5 |
| Polyol-45A | MMA/EHA/MPEG-350 | 75/20/5 |
| Polyol-47 | MMA/Oe | 75/25 |
| Polyol-51 | MMA/EHA | 82/18 |
| Polyol-53 | MMA/EHA/EOEO | 75/15/10 |
| Polyol-76 | IBA/MMA/EHA/EOEO | 70/9/11/10 |
| Polyol-77 | BzMA/IBA/EHA/EOEO | 40/45/5/10 |
| Polyol-78 | CHMA/IBA/EHA/EOEO | 60/18/12/10 |
| Polyol-79 | CHMA/MMA/EHA/EOEO | 60/18/12/10 |

Comparative Example 1

C-PU-6 was synthesized using diaminoalkylsulfonate using the following steps.
1. 40.6 grams PPG ($M_w$ is 1000 g/mol), 169.6 grams of Polyol-53 (TS 70.7 wt %), 11.67 grams of DMPA, and 70 ml of acetone were mixed in a 2000 ml of 4-neck round bottom flask. 91.3 grams of HMDI and 20 ml of acetone were added to the flask.
2. A mechanical stirrer with glass rod and Teflon blade and a condenser were attached. The flask was immersed in a constant temperature bath at about 65° C.
3. The system was kept under dry nitrogen blanket.
4. 12 drops of dibutyltindilaurate (warmed in about 50° C. oven first) was added to initiate the polymerization.
5. Polymerization was continued for about 8 hours at about 65° C. 0.5 grams samples was withdrawn for % NCO titration to ensure the first stage reaction was complete. Theoretical % NCO should be 5.07%.
6. 150 ml of acetone was added to dilute the prepolymer solution and the bath temperature was reduced to about 40° C.
7. 61.8 grams of VESTAMIN® A-95 solution (50 wt % solid), 10.85 grams of KOH, and 176.2 grams of deionized water were mixed in a beaker for about 30 seconds and added to the prepolymer solution at about 40° C. with vigorous stirring over about 1-3 mins. The temperature was maintained at about 45° C. for about 30 minutes. The solution turned viscous and semi-transparent.
8. 701 grams of deionized water was pumped to the polymer mixture over about 15-30 minutes at about 45° C.-50° C. and then for an additional at least about 60 minutes.
9. Acetone was removed under vacuum. The final PU dispersion was filtered through 400 mesh and fiber glass filter paper. The PU dispersion particle size measured to be about 25.8 nm in radius. The PU dispersion pH was about 10.3. The PU dispersion % solids was measured to be about 25.5 wt % and the PU dispersion was measured to have a viscosity of about 6.4 cps.

Example 2

I-PU-1 was synthesized using diaminoalkylsulfonate using the following steps.
1. 42.6 grams PPG ($M_w$ is 1000 g/mol), 186.15 grams of Polyol-53 (TS 70.7 wt %), 12.24 grams of DMPA, and 70 ml of acetone were mixed in a 2000 ml of 4-neck round bottom flask. 81.2 grams of IPDI and 20 ml of acetone were added to the flask.
2. A mechanical stirrer with glass rod and Teflon blade and a condenser were attached. The flask was immersed in a constant temperature bath at about 65° C.
3. The system was kept under dry nitrogen blanket.
4. 12 drops of dibutyltindilaurate (warmed in about 50° C. oven first) was added to initiate the polymerization.
5. Polymerization was continued for about 8 hours at about 65° C. 0.5 grams samples was withdrawn for % NCO titration to ensure the first stage reaction was complete. Theoretical % NCO should be 5.35%.
6. 150 ml of acetone was added to dilute the prepolymer solution and the bath temperature was reduced to about 40° C.
7. 64.8 grams of VESTAMIN® A-95 solution (50 wt % solid), and 162.0 grams of deionized water were mixed in a beaker for about 30 seconds and added to the prepolymer solution at about 40° C. with vigorous stirring over about 1-3 mins. The temperature was maintained at about 45° C. for about 30 minutes. The solution turned viscous and semi-transparent.
8. 11.38 grams of KOH (45%) and 34.1 grams of water were mixed in a beaker and added to the mixture above and mixed for another 20 minutes.
9. 972 grams of deionized water was pumped to the polymer mixture over about 15-30 minutes at about 45° C.-50° C. and then for an additional at least about 60 minutes.
10. Acetone was removed under vacuum. The final PU dispersion was filtered through 400 mesh and fiber glass filter paper. The PU dispersion particle size measured to be about 25.8 nm in radius. The PU dispersion pH was about 10.3. The PU dispersion % solids was measured to be about 23.1 wt % and the PU dispersion was measured to have a viscosity of about 6.4 cps.

Example 3

Additional polyurethane-based binder dispersions (i.e., PUs) were synthesized in the same manner as Example 2 using the materials and amounts summarized in Table 3 below.

TABLE 3

| PU ID | Acrylonitrile (wt %) | (A) | (B) | (C) | (D) | (E) | (F) | Wt % |
|---|---|---|---|---|---|---|---|---|
| C-PU-1 | 42.1 | IPDI | Polyol-14 | BGDA | DMPA | Taurine | M2070 | 21.1/51.3/13.3/1.6/7.9/4.7 |
| C-PU-2 | 45.7 | HMDI | Polyol-14 | C-590 | DMPA | VESTAMIN® A-95 | — | 32.1/44.1/10.0/4.1/9.7 |
| C-PU-3 | 48.1 | IPDI | Polyol-34 | C-590 | DMPA | VESTAMIN® A-95 | — | 28.6/46.4/10.5/4.3/10.2 |
| C-PU-4 | 48.1 | IPDI | Polyol-38 | C-590 | DMPA | VESTAMIN® A-95 | — | 28.6/46.4/10.5/4.3/10.2 |
| C-PU-5 | 48.1 | IPDI | Polyol-47 | C-590 | DMPA | VESTAMIN® A-95 | — | 28.6/46.4/10.5/4.3/10.2 |

TABLE 3-continued

| PU ID | Acrylonitrile (wt %) | (A) | (B) | (C) | (D) | (E) | (F) | Wt % |
|---|---|---|---|---|---|---|---|---|
| C-PU-6 | 46.7 | HMDI | Polyol-53 | PPG1K | DMPA | VESTAMIN ® A-95 | — | 30.4/41.8/13.5/3.9/10.3 |
| C-PU-7 | 48.1 | IPDI | Polyol-14 | C-590 | DMPA | VESTAMIN ® A-95 | — | 28.6/46.4/10.5/4.3/10.2 |
| C-PU-8 | 48.1 | IPDI | Polyol-37 | C-590 | DMPA | VESTAMIN ® A-95 | — | 28.6/46.4/10.5/4.3/10.2 |
| C-PU-9 | 44.7 | IPDI | Polyol-14 | C-590 | DMPA | VESTAMIN ® A-95 | M2070 | 27.2/44.2/10/4.1/9.3/5.1 |
| C-PU-10 | 48.1 | IPDI | Polyol-45 | C-590 | DMPA | VESTAMIN ® A-95 | — | 28.6/46.4/10.5/4.3/10.2 |
| C-PU-11 | 48.1 | IPDI | Polyol-43 | C-590 | DMPA | VESTAMIN ® A-95 | — | 28.6/46.4/10.5/4.3/10.2 |
| I-PU-1 | 48.9 | IPDI | Polyol-53 | PPG1K | DMPA | VESTAMIN ® A-95 | — | 27/43.9/14.2/4.1/10.8 |
| I-PU-2 | 56.4 | IPDI | Polyol-45A | PPG1K | DMPA | VESTAMIN ® A-95 | — | 29.8/36.2/16.7/4.5/12.7 |
| I-PU-3 | 56.4 | IPDI | Polyol-14 | PPG1K | DMPA | VESTAMIN ® A-95 | — | 29.8/36.2/16.7/4.5/12.7 |
| I-PU-4 | 58.5 | IPDI | Polyol-14 | PTMG1K | DMPA | VESTAMIN ® A-95/Taurine | — | 27.2/48.6/12.3/4.1/7.8/4.1 |
| I-PU-5 | 48.9 | IPDI | Polyol-51 | PPG1K | DMPA | VESTAMIN ® A-95 | — | 27/43.9/14.2/4.1/10.8 |
| I-PU-6 | 47.8 | IPDI | Polyol-14 | PPG1K | DMPA | VESTAMIN ® A-95 | — | 26.7/43.3/15/3.4/11/4 |
| I-PU-7 | 50.2 | IPDI | Polyol-53 | PPG725 | DMPA | VESTAMIN ® A-95 | — | 28/45.5/11.4/4.9/10 |

Prophetic Example 1

Additional polyurethane-based binder dispersions (i.e., PUs) can be synthesized in the same manner as Example 2 using sulfonic/sulfonate amine compounds having three to ten amino groups.

Example 4

Sustained Printing and Recovery (SPAR) was tested for some PU dispersions summarized in Table 3 above. SPAR testing involved continuous printing of a pre-determined stress image into a waste container for a defined period of time. After this, a servicing algorithm was applied to recover degraded nozzle health and to clean residual ink (from puddling or aerosol) on the nozzle plate. In between the stress image print cycles, a nozzle health pattern was printed, to track the nozzle health performance over time.

The nozzle health pattern was graded using the Inspector nozzle health algorithm—the metrics used include missing nozzles, vertical trajectory error or deviated nozzles (greater than 30 µm relative to the average measured nozzle-to-nozzle vertical spacing) and weak nozzles. These metrics are used to determine what kind of obstruction is at the nozzle. Thresholds (given a B grade, i.e., greater than or equal to 40 defective nozzles) and targets (given an A grade, i.e., greater than or equal to 10 defective nozzles but less than 40 defective nozzles) for nozzle health performance is defined by summing all three metrics above per pen trench. The threshold and target were based on studies on the impact of missing nozzles to IQ.

FIG. 1 shows a bar graph of polyurethane dispersions versus the average of the sum of defective nozzles. This FIG. 1 shows that C-PU-7 failed the sustained printing test because its average number of the sum of all defective nozzles was well over target "A" and threshold "B." In contrast, I-PU-3 and I-PU-1 show much better performance, having average numbers of the sum of defective nozzles that were under the target "A" and threshold "B." The higher the defective number of nozzles, the worse the PU dispersion performed (higher number=more defective nozzles=worse sustained printing performance). The sum of defective number of nozzles includes an average across multiple sustained printing tests and multiple ink colors (i.e., black and magenta).

Example 5

Inkjet ink compositions A-D were prepared as summarized in Table 4 below using various polyurethane-based binder dispersions (PU-X; identified in detail in Table 5) from Table 3 above.

TABLE 4

| | Ink Composition A (wt %) | Ink Composition B (wt %) | Ink Composition C (wt %) | Ink Composition D (wt %) |
|---|---|---|---|---|
| 1-(2-Hydroxyethyl)-2-pyrrolidone | 5.00 | — | 5.00 | — |
| Glycerol | — | 6.00 | — | 6.00 |
| Tripropylene glycol methyl ether (DOWANOL ™ TPM) | — | 3.00 | — | 3.00 |
| CRODAFOS ™ N3 | 0.50 | 0.50 | 0.50 | 0.50 |
| SURFYNOL ® SE-F | 0.30 | — | 0.30 | — |

TABLE 4-continued

|  | Ink Composition A (wt %) | Ink Composition B (wt %) | Ink Composition C (wt %) | Ink Composition D (wt %) |
|---|---|---|---|---|
| SURFYNOL ® CT-211 | 0.30 | — | 0.30 | — |
| SURFYNOL ® 440 | — | 0.25 | — | 0.25 |
| DYNOL ™ 360 | — | 0.25 | — | 0.25 |
| LIPONIC ® EG-1 | 1.00 | 2.00 | 1.00 | 2.00 |
| LIQUILUBE ™ 405 Wax | 1.00 | 0.75 | 1.00 | 0.75 |
| Polyurethane Binder (PU-X) | 5.00 | 5.00 | 3.50 | 3.50 |
| Styrene acrylate with black pigment | 2.75 | 2.75 | — | — |
| Styrene acrylate with magenta pigment | — | — | 4.00 | 4.00 |
| Water | 84.15 | 79.50 | 84.40 | 79.75 |
| Total | 100 | 100 | 100 | 100 |

The SPAR performance of PU dispersions in Table 3 is summarized in Table 5 below. The SPAR test score is the combination of jetting performance and ease of servicing. 5 is the best and 1 is the worst in SPAR test scores.

TABLE 5

| PU ID | Component (A) | Component (C) | SPAR | Ink Composition |
|---|---|---|---|---|
| C-PU-2 | HMDI | C-590 | 1 | A, C |
| C-PU-3 | IPDI | C-590 | 1 | A, C |
| C-PU-4 | IPDI | C-590 | 1 | A, C |
| C-PU-5 | IPDI | C-590 | 1 | A, C |
| C-PU-6 | HMDI | PPG1K | 1 | B, D |
| C-PU-7 | IPDI | C-590 | 2 | A, C |
| C-PU-8 | IPDI | C-590 | 2 | A, C |
| C-PU-9 | IPDI | C-590 | 2 | A, C |
| C-PU-10 | IPDI | C-590 | 2 | A, C |
| C-PU-11 | IPDI | C-590 | 2 | A, C |
| I-PU-1 | IPDI | PPG1K | 4.5 | A, C |
| I-PU-2 | IPDI | PPG1K | 4 | A, B, C, D |
| I-PU-3 | IPDI | PPG1K | 4.5 | A, C |
| I-PU-4 | IPDI | PTMG1K | 4 | A, B, C, D |
| I-PU-5 | IPDI | PPG1K | 4 | A, C |
| I-PU-6 | IPDI | PPG1K | 4 | B, D |
| I-PU-7 | IPDI | PPG725 | 4 | B, D |

As shown in Table 5 above, the PU dispersions with the combination of IPDI with PPG or PTMG (polyether polyol) demonstrated much better SPAR results than with the combination of HMDI with PPG or the combination of IPDI with C-590 (polycarbonate polyol).

The polyurethane-based binder dispersions described above exhibit great SPAR performance over many hours of printing and as a result require little or no printhead servicing while printing. This enables higher print speeds and therefore higher press productivity for packaging press owners. The ability to recover the printheads with minimal servicing reduces down time and increases press productivity which can be important in the industrial printing market.

In addition, the above-described polyurethane-based binder dispersions can still be used in high amounts in the ink compositions (e.g., 3.5 wt % or 5 wt %), enabling prints with durability.

While several examples have been described in detail, it is to be understood that the disclosed examples may be modified. Therefore, the foregoing description is to be considered non-limiting.

What is claimed is:

1. An inkjet ink composition, comprising:
   water;
   at least one co-solvent;
   at least one surfactant;
   at least one colorant; and
   a polyurethane-based binder dispersion comprising:
   water and a polyurethane, wherein the polyurethane comprises:
   (A) a polyisocyanate, which is isophorone diisocyanate (IPDI), 2,2,4-trimethyl-hexamethylene-diisocyanate (TMDI), dicyclohexylmethane-4,4-diisocyanate (H12MDI), hexamethylene-1,6-diisocyanate(HDI), or mixtures thereof,
   (B) a first polyol having a chain with two hydroxyl functional groups at one end of the chain and no hydroxyl groups at an opposed end of the chain,
   (C) a second polyol having a chain with one hydroxyl functional group at each end of the chain,
   (D) a hydroxyl-carboxylic acid having a formula: $(HO)_xQ(COOH)_y$, where Q is a straight or branched hydrocarbon radical containing 1 to 12 carbon atoms, and x is 2 or 3 and y ranges from 1 to 3,
   (E) a sulfonate or sulfonic acid amine compound having two amino functional groups, and
   (F) an optional homopolymer or copolymer of poly(ethylene glycol) having one or two hydroxyl functional groups or one or two amino functional groups at one end of its chain.

2. The inkjet ink composition of claim 1, wherein (A) is present in the polyurethane-based binder dispersion in an amount of from about 20 wt % to about 35 wt % based on the total weight of the polyurethane-based binder dispersion.

3. The inkjet ink composition of claim 1, wherein (B) is present in the polyurethane-based binder dispersion in an amount of from about 30 wt % to about 60 wt % based on the total weight of the polyurethane-based binder dispersion.

4. The inkjet ink composition of claim 1, wherein:
   (B) is formed from a free radical polymerization of a monomer in the presence of a mercaptan including two hydroxyl functional groups or two carboxylic functional groups;
   the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and
   the mercaptan is selected from the group consisting of 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

5. The inkjet ink composition of claim 1, wherein (C) is present in the polyurethane-based binder dispersion in an amount of from about 8 wt % to about 20 wt % based on the total weight of the polyurethane-based binder dispersion.

6. The inkjet ink composition of claim 1, wherein (C) is poly(propyleneglycol), poly(tetrahydrofuran), poly(carbonate) polyol, or mixtures thereof.

7. The inkjet ink composition of claim 1, wherein (D) is present in the polyurethane-based binder dispersion in an amount of from about 2 wt % to about 8 wt % based on the total weight of the polyurethane-based binder dispersion.

8. The inkjet ink composition of claim 1, wherein (D) is dimethylolpropionic acid (DMPA), dimethylol butanoic acid (DMBA), tartaric acid, dihydroxymaleic acid; or mixtures thereof.

9. The inkjet ink composition of claim 1, wherein (E) is present in the polyurethane-based binder dispersion in an amount of from about 5 wt % to about 15 wt % based on the total weight of the polyurethane-based binder dispersion.

10. The inkjet ink composition of claim 1, wherein (E) is ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2-aminoethyl)amino]-1-propanesulfonic acid or a salt thereof, 2-[bis(2-aminoethyl)amino]-ethanesulfonic acid or a salt thereof, 2-[(2-aminoethyl)amino]-1-propanesulfonic acid or a salt thereof, 2-[[2-[(1-methylethyl)amino]ethyl]amino]-ethanesulfonic acid or a salt thereof, 2-[(2-aminoethyl) amino]-1-pentanesulfonic acid or a salt thereof, or mixtures thereof.

11. The inkjet ink composition of claim 1, wherein
(A) is isophorone diisocyanate, which is present in the polyurethane in an amount of from about 24 wt % to about 30 wt % based on the total weight of the polyurethane,
(B) is a copolymer of methyl methacrylate-co-ethylhexylacrylate-co-ethoxyethoxyethylacrylate with the two hydroxyl functional groups at the one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B),
(C) is polypropylene glycol with a Mn of 1000 g/mol, which is present in the polyurethane in an amount of from about 12 wt % to about 18 wt % based on the total weight of the polyurethane,
(D) is dimethylolpropionic acid, which is present in the polyurethane in an amount of from about 2 wt % to about 6 wt % based on the total weight of the polyurethane, and
(E) is sodium 2-[(2-aminoethyl)amino]ethanesulphonate, which is present in the polyurethane in an amount of from about 8 wt % to about 12 wt % based on the total weight of the polyurethane.

12. A method of making the inkjet ink composition of claim 1 comprising:
mixing the water; the at least one co-solvent; the at least one surfactant; the at least one colorant; and the polyurethane-based binder dispersion.

* * * * *